UNITED STATES PATENT OFFICE.

ANDREW A. DUNHAM, OF BAINBRIDGE, NEW YORK, ASSIGNOR TO CASEIN COMPANY OF AMERICA, OF NEW YORK, N. Y., A CORPORATION OF NEW JERSEY.

PAPER-COATING COMPOSITION AND METHOD OF MAKING THE SAME.

1,141,951.  Specification of Letters Patent.  Patented June 8, 1915.

No Drawing.  Application filed May 9, 1911.  Serial No. 625,990.

*To all whom it may concern:*

Be it known that I, ANDREW A. DUNHAM, a citizen of the United States, residing at Bainbridge, county of Chenango, State of New York, have invented certain new and useful Improvements in Paper-Coating Compositions and Methods of Making the Same; and I do hereby declare the following to be a full, clear, and exact description of the invention, such as will enable others skilled in the art to which it appertains to make and use the same.

In Letters Patent of the United States, granted to Henry V. Dunham and myself, No. 1,053,719, under date of February 18, 1913, we have described and claimed certain new and useful improvements in the treatment of starch to adapt it for use in the coating of paper. In the practice of said improvements we employ oxalic acid for the modification of the starch and arrest the modification at a stage which will adapt the resulting product for subsequent admixture with a suitable mineral base or filler to produce a coating on paper which will be strongly adhesive to the paper.

My present invention is based, broadly, upon the discovery that by the addition of casein, as hereinafter described, to starch modified or changed by the action of oxalic acid or an equivalent hydrolyzing or modifying agent, the modification of the starch being arrested at a stage which will adapt the resulting product for subsequent admixture with a mineral base or filler to produce a coating on paper, the composition so produced will be of a thin flowing consistency and may be applied to the paper uniformly, smoothly and tenaciously and without leaving brush marks upon the finished surface, and when dried will be strongly adhesive to the paper.

In the preferred practice of my invention, I contemplate the manufacture of a substantially dry product suitable for storage and transportation as an article of manufacture and sale; although, as will hereinafter more fully appear, the invention, broadly considered, is of such a character that it may be practised, in the coating of paper, without the production of an intermediate dry product.

In the preferred practice referred to, I first treat the starch without breaking up the starch granules and with the employment of the minimum amount of water as the dissolving medium for the modifying agent, i. e. an amount sufficient to bring the modifying agent into intimate contact with the individual starch granules throughout the mass; I then dry the mass until it has been brought back to substantially the condition of dryness of the original starch, which usually contains from 9% to 10% by weight of moisture. The drying operation is preferably conducted *in vacuo* and at a temperature insufficient to break up the starch granules, and the modifying action of the acid or its equivalent is continued, under the stimulating effect of the existing temperature conditions prevailing in the vacuum drier, until arrested at a stage corresponding to the viscosity contemplated for ultimate incorporation with the mineral base. In order to thus arrest the modification and to positively insure against its recurrence in the mass, I employ an alkaline re-agent of any suitable kind and which may be, for instance, an alkali which when added to the acidulated modified starch will act as a neutralizing agent and will so adapt the product that, when added to the mineral base, as hereinafter described, there will result no such thickening up of the same into a pasty mass as would make it unsuitable for paper coating. On the contrary, the product when thus added to the mineral base, will run smoothly when applied by the ordinary coating machines well known to the art. I have found that ammonia possesses this property and I preferably use the same for the reason that the employment of ammonia permits of the complete neutralization of the mass with the production of a neutral salt and the volatilization of any excess of ammonia employed. To produce the dry product, the neutralized modified starch may then be dried in any usual manner. To the dry product just described there is then added finely powdered casein which has first received an addition of some suitable alkaline material, such as an alkali.

In order to more fully describe the details of a typical example of the practice of my invention for the production of a dry product, I will now give an instance of its commercial practice, under preferred conditions; 800 lbs. of the starch to be modified are admixed with a solution consisting of 40 lbs. of oxalic acid crystals dissolved in 200 lbs. of water, and the mixture is stirred in an apparatus of the type of a dough mixer or the like until the solution has been uniformly and homogeneously incorporated with the starch granules. At the conclusion of the mixing operation, the starch mass will have absorbed the solution of oxalic acid and will be sufficiently damp so that, if a portion of it is squeezed in the hand, it will have sufficient cohesion to barely ball or cake together, showing the imprint of the fingers. In some instances, a greater or less amount of oxalic acid may be employed, but the amount of oxalic acid should preferably not fall below from 30 to 35 lbs. in any case in a mixture of the relative quantities of starch and water above noted. So also, a larger proportion of water may be used but, in that event, a corresponding additional burden would be imposed upon the drying apparatus employed in the next stage of the manufacture. The dampened mass of starch, homogeneously admixed with the solution of oxalic acid, is next introduced into a rotary vacuum drier, which is preferred for the reason that it insures the uniform conduct of the process during this period, and particularly because it permits the speeding up of the drying operation, at a temperature which is safely below the limits of the temperature which would break up the starch granules and convert the mass into a paste. The rotary vacuum drier that I prefer for the purpose would be provided with a steam jacket, which may conveniently be supplied with steam at say 20 lbs. superatmospheric pressure, corresponding to a temperature of about 259° F. Within the vacuum drier, I prefer to maintain a vacuum of say 20 inches, so that the internal temperature during the drying operation shall be correspondingly restricted well below the limit of the breaking up of the starch granules. It is found that at the termination of a period varying somewhat with the prevailing conditions, but usually about one and one half hours, and while the drier is rotating at an average speed of from five to six revolutions per minute, the water of solution has been practically expelled, leaving the starch with about its original content of moisture, say 9 to 11% by weight. Under the continued action of the heat, the oxalic acid exerts a continued modifying action upon the starch, and, at this stage of the operation, extreme care must be taken to supervise and test its progress, so that it may neither fall short of nor exceed the limits necessary for the ultimate result. To this end, from time to time, the rotation of the drier is interrupted and a sample of the contents is taken and quickly tested for viscosity.

A suitable viscosity test which I have used with successful results consists in comparing the rate of flow of a standard solution of the test sample, neutralized and boiled, as hereinafter specified, with the rate of flow of water through a burette, delivering 58 c. c. of water in a period of half a minute. The burette has a length of 36 inches, and an internal diameter of ⅜ths of an inch. To 100 grams of the dry starch is first added 400 grams of cold water. The water and starch are stirred well together and sufficient ammonia of 26° Baumé is added to make the solution alkaline. The mixture is heated to between 185° F. and 190° F. thereby breaking up the starch granules. Then enough cold water is added to produce a volume of about 970 c. c. of the mixture at a temperature of 100° F. In the meantime, the burette has been brought to the same temperature and the burette is filled with the solution and its rate of flow tested. When the test of any particular sample, (with due allowance for the time occupied by the making of the test) indicates that the starch in the drum will respond to a viscosity flow of from 40 c. c., or thereabout, to 45 c. c. or thereabout (for printing and ordinary lithographic work I have employed a viscosity flow corresponding to 45 c. c. or thereabout; for the higher grades of lithographic work, a viscosity flow of 40 c. c. or thereabout) in half a minute from the burette employed, the rotation of the drum is interrupted and its contents are immediately discharged into a second mixing apparatus containing 40 lbs. of 26° ammonia in 200 lbs. of water. The mass is at once vigorously stirred, so as to interrupt the modifying action by thoroughly neutralizing the acid. Thereupon, the neutralized mass of modified starch is dried in any convenient manner, as, for instance, by being placed in shallow trays and heated in a drying tunnel or the like.

It will usually be found desirable, before placing the neutralized mass in the trays to pass it through a breaker for the purpose of breaking up any lumps that may have formed, so that the drying operation may proceed with corresponding promptness and uniformity. It is unnecessary to take special precautions during the drying of the neutralized mass, inasmuch as there will be no prejudicial changes in the desired characteristics of the modified starch after it has reached this stage of the operation. There is now added to the starch product, modified, neutralized and dried, as hereinbefore described, casein and an alkali or alkaline material in an amount sufficient, when admixed with a suitable mineral base, to produce a composition which will be of a thin flowing consistency, capable of being applied to paper uniformly, smoothly and tenaciously, without leaving brush marks upon the finished surface and which, when dried, will be strongly adhesive to the paper.

In practice, I have used, with good results, casein in amount equal to 10% by weight of the modified starch, and have added to the casein, for the purpose of rendering same soluble, 2% of disodium phosphate. These proportions may be varied according to the class of coating required.

In order to make up the composition employed for the coating of lithographer's paper, a suitable mineral base may be employed, as for instance, kaolin, blanc fixe, or the like. In the case of kaolin, 100 lbs. may be employed intimately mixed with 50 lbs. of water. 25 lbs of the dry modified starch produced in accordance with the method hereinbefore described, to which has been added 10% or more by weight of finely powdered casein admixed with a suitable alkali or alkaline material or substance having the power of dissolving casein, is then intimately mixed with 100 lbs. of cold water and the mixture is heated to a temperature such that the starch granules will be broken up, a temperature of about 185° F. to 190° F. ordinarily sufficing for the purpose. The starch-casein thus obtained is then mixed with kaolin and water until the whole is in a homogeneous union. The mixture is then strained and is ready for the paper coater, who may use additional water for thinning down purposes, according to the particular character of coating which he wishes to produce for the purpose at hand. Where another mineral base is employed in conjunction with kaolin the same proportion of modified starch may be used as if kaolin were alone employed, i. e., 25 lbs. of modified starch to 100 lbs. of the total mineral base employed.

If it be desired to use satin white in conjunction with kaolin, the satin white should first be sized with casein glue. I have used with good results for sizing satin white about 10% of its weight of casein glue. The sized satin white should then be added to the kaolin sized as hereinbefore described.

When, for special reasons, it is desired to make use of the fundamental features of my invention, for the production of a composition to be immediately applied to the paper, I may proceed directly with the production of the coating without producing the modified starch in a dry state. In accordance with this practice, I prefer to introduce the starch and the oxalic acid, in the same relative quantities in a volume of water sufficient to bring the starch into suspension, and to then heat the mixture sufficiently to break up the starch granules and expose the broken granules at once to the full action of the oxalic acid. This is entirely feasible on an economical basis, for the reason that the mass thus produced does not require to be dried before being put into use; whereas, for the production of a dry product it is undesirable to thus break up the starch granules for the reason that the resulting paste would be difficult to dry except at considerable expense, and under conditions difficult to effectually supervise and determine.

When, in the modification of the process referred to, the boiling has proceeded until a test sample, containing the same relative weight of starch to water as in the standard solution hereinbefore specified indicates the desired viscosity, the necessary amount of ammonia is added to the vat to effect the entire neutralization of the acid or like modifying agent, ten per cent. (10%) or more by weight of finely powdered casein which has received an addition of some suitable alkali or alkaline material or substance having the power of dissolving casein, as, for instance, 2 per cent. of disodium phosphate, is then mixed with a small quantity of water and brought into solution and this solution of alkalized casein is added to the modified and neutralized starch. The resultant mass of modified starch and casein is then ready for incorporation with the corresponding relative quantity of mineral base for the final coating composition. The mineral base in admixture with the appropriate amount of water is thereupon incorporated with the mass of modified starch and casein, and the composition thus produced is ready after straining, for use.

In some instances, I prefer to add to the composition of modified starch and casein, a suitable amount of formaldehyde to give it water-proofing properties, and also to guard against decomposition and fermentative action, when, for any reason, such action is to be apprehended, as, for example, when the exigencies of manufacture or use cause it to be kept temporarily (say over night) in the wet or moist state.

Having thus described my invention what I claim is:

1. The method of producing a composition for use in paper coating, which comprises modifying a body of starch by the action of a hydrolyzing agent, neutralizing the modified starch by means of ammonia, and admixing it with casein, a substance having the power of dissolving casein, and a large proportion of a suitable mineral base, together with water, the modification of the starch being arrested after proceeding so far that the final coating composition will have a free flowing consistency and strong adhesion when applied as a coating to paper; substantially as described.

2. The method of producing a composition for use in paper coating, which comprises modifying a body of starch by the action of a solution of a hydrolyzing agent, evaporating the solvent, neutralizing the modified starch by means of ammonia, and admixing it with casein, a substance having the power of dissolving casein, and a large proportion of a suitable mineral base, together with water the modification of the starch being arrested after proceeding so far that the final coating composition will have a free flowing consistency and strong adhesion when applied as a coating to paper; substantially as described.

3. The method of producing a composition for use in paper coating, which consists in modifying a body of starch by the action of a solution of a hydrolyzing agent, evaporating the solvent, neutralizing the modified starch by means of ammonia, drying the modified neutralized starch, and admixing it with casein, a substance having the power of dissolving casein, and a large proportion of a suitable mineral base, together with water, the modification of the starch being arrested after proceeding so far that the final coating composition will have a free flowing consistency and strong adhesion when applied as a coating to paper; substantially as described.

4. As a paper coating composition, casein, a substance having the power of dissolving casein, a large proportion of a suitable mineral base and starch which has been modified by a hydrolyzing agent to such an extent that when admixed with water, the composition will be strongly adhesive, of free flowing consistency, and capable of use without leaving superficial brush marks when applied as a coating to paper; substantially as described.

5. As a paper coating composition, casein, a substance having the power of dissolving casein, a large proportion of a suitable mineral base and starch which has been modified by a hydrolyzing agent to such an extent that when admixed with water, the composition will be strongly adhesive, of free flowing consistency, and capable of use without leaving superficial brush marks when applied as a coating to paper, said composition having been treated with formaldehyde; substantially as described.

6. As a paper coating composition, casein, a substance having the power of dissolving casein, a large proportion of a suitable mineral base and starch which has been modified by a hydrolyzing agent to such an extent that when admixed with nine parts by weight of water and neutralized with ammonia and heated to a temperature sufficient to break up its starch granules it will have, after cooling to 100° F., a viscosity ranging from 40 c. c. or thereabout, to 45 c. c. or thereabout, per half minute, as measured by a burette delivering 58 c. c. of water per half minute; substantially as described.

In testimony whereof I affix my signature, in presence of two witnesses.

ANDREW A. DUNHAM.

Witnesses:
D. A. STEVENS,
O. L. CRUMB.